Sept. 25, 1928.
E. W. DAVIS
1,685,351
SWIVEL COUPLING
Filed Oct. 5, 1923
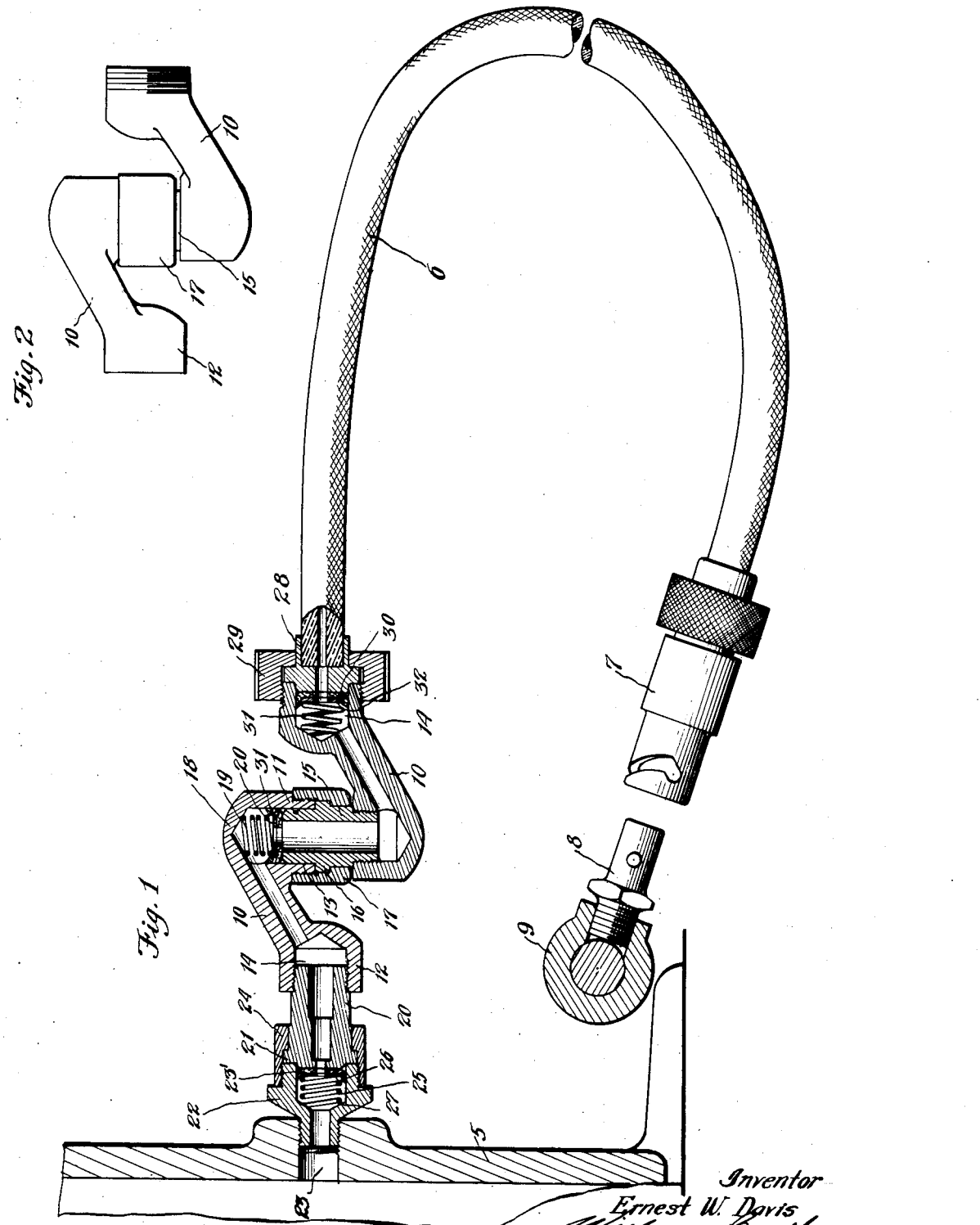
Inventor
Ernest W. Davis Patented Sept. 25, 1928.

1,685,351

UNITED STATES PATENT OFFICE.

ERNEST W. DAVIS, OF OAK PARK, ILLINOIS, ASSIGNOR TO THE BASSICK MANUFACTURING COMPANY, OF CHICAGO, ILLINOIS, A CORPORATION OF DELAWARE.

SWIVEL COUPLING.

Application filed October 5, 1923. Serial No. 666,722.

My invention relates to improvements in swivel couplings and is particularly concerned with a swivel coupling forming a part of a lubricating system comprising a lubricant compressor or source of lubricant under pressure having a flexible discharge conduit for supplying lubricant to the bearings to be lubricated. In certain lubricating systems such as described, the compressor or source of supply is mounted upon a sliding or rolling base, so as to permit it to be drawn around into position to enable the various bearings to be supplied with lubricant. The operator usually accomplishes this result by pulling upon the flexible hose forming the discharge conduit of the compressor or source of supply. The strain thus imposed upon the flexible hose heretofore tended to cause disruption of the walls of the hose at the point where it is connected to the compressor.

One of the objects of my invention is to provide a swivel coupling for connecting one end of the flexible hose or discharge conduit to the compressor or source of supply which will enable the operator to pull upon the hose without flexing or twisting it at its point of connection with the compressor or source of supply.

Another object of my invention is to provide a coupling such as described which will enable the operator easily to position the flexible hose or discharge conduit so as to supply the lubricant to a desired bearing.

A still further object of my invention is to provide a swivel coupling of the character described which is simple in construction, economical to manufacture and capable of withstanding extremely high pressures.

An additional object of my invention is to provide a swivel coupling of the character described in which the strains imposed upon the movable parts thereof are distributed so as to insure a minimum amount of wear.

The above and other objects of my invention will appear as this description progresses, reference being had to the accompanying drawings, in which Figure 1 is a view showing my improved coupling in central longitudinal section embodied in a lubricating system; and Figure 2 is a side elevation of a portion of my improved coupling.

In both views similar characters will be used for referring to similar parts.

In the drawings I have illustrated my invention as comprising part of a lubricating system which includes a suitable compressor or source of supply 5 having a flexible discharge conduit 6, the outer end of which is provided with a coupling member 7 adapted to make a sealed detachable connection with a nipple or fitting 8 secured to the bearing 9, for the purpose of supplying lubricant under pressure to this bearing. The construction of the compressor 5, the hose 6, the coupling 7 and fitting 8 is well-known to those skilled in the art to which my invention relates, and further description thereof appears to be unnecessary.

The means which I provide for connecting the inner end of the flexible hose 6 with the compressor comprises the two tubular members 10, each of which has one end 11 offset from the other end 12 and provided with a laterally directed end opening 13. The other end opening 14 of each tubular member is disposed at substantially right angles to the laterally directed end openings 13.

A tubular conduit 15 has one end secured in one of the end openings 13 and its other end rotatably mounted in the other end opening 13. The tubular conduit 15 is provided with an annular rib or shoulder 16 which is clamped between the adjacent end of the tubular member 10 and the follower 17 which is threaded upon the last mentioned end of the tubular member 10 in which the end of the conduit 15 is rotatably mounted. A gasket 18, which is here shown as being in the form of a cup leather, is held against the inner end of the tubular conduit 15 by means of the compression spring 19 which is confined between the washer 20' located in the bottom of the cup leather and the adjacent wall of the tubular member 10. The gasket 18 is positioned so that the pressure of the lubricant passing through the swivel coupling is exerted on the inner face of the gasket, thereby increasing the seal between it and the inner end of the conduit 15 as the pressure on the lubricant increases.

A tubular swivel member 20 is secured to one end of the tubular member 10 which is connected with the compressor 5 in communication with the end opening 14 therein, and is provided at its outer end with an annular rib 21. A nipple 22, one end of which is threaded into the discharge opening 23 of the compressor 5, is rotatably mounted upon the swivel member 20 by means of the follower 24, between which and one end of the nipple 22 the annular rib 21 is confined. A cup leather gasket 23' is held in sealing contact with the outer end of the swivel member 20 by means of a compression spring 25 confined between the washer 26 in the bottom of the gasket 23' and the shoulder 27 formed by the enlarged portion of the bore of the nipple 22.

The inner end of the hose 6 terminates in a nipple 28 which is rotatably mounted or swiveled upon the outer end of the other tubular member 10 by means of the follower 29. The escape of lubricant between the nipple 28 and the adjacent end of the member 10 is prevented by means of the cup leather gasket 30, which is held in contact with the inner end of the nipple 28 by means of the compression spring 31 confined between the washer 32 in the bottom of the cup leather and the adjacent wall of the tubular member 10.

It will be noted from an inspection of Fig. 1 that the axes of the nipples 22 and 28 are arranged at substantially right angles to the axis of the conduit 15 and in alignment with each other. This construction assures the even distribution of any stresses imposed upon the tubular member 15, due to the operator pulling upon the discharge conduit or hose 6, and thus minimizing the wear upon the conduit 15 and associated parts.

By means of the construction described above, flexing of the hose at the point of contact is prevented, due to the fact that the member 10 having the conduit 15 secured thereto will pivot upon the other member 10 and the two swivel devices at the ends of the coupling member eliminate twisting stresses which might otherwise be imposed upon the conduit 6.

The construction described above is simple, economically manufactured and capable of withstanding extremely high pressures. The swivel coupling just described has operated successfully to conduct lubricant under pressures as high as 11,000 pounds per square inch.

While I have described the details of construction of the preferred embodiment of my invention, it is to be clearly understood that my invention is not limited to these details, but is capable of other adaptations and modifications within the scope of the appended claim.

Having thus described my invention, what I claim is:

In high pressure lubricating apparatus of the class described, a swivel coupling comprising a pair of conduit elements each having a transversely directed opening, an externally shouldered tubular member secured in one of said elements and having its extremity projecting within the transversely directed opening of the other element, means engaging the shoulder on said tubular member to maintain its extremity within said last named element, and a cup washer held against the transverse end face of the extremity of said tubular member and the inner wall of said last named element, said cup washer being positioned so as to exert additional pressure against the parts engaged thereby when fluid under pressure is present within the swivel coupling.

In witness whereof, I hereunto subscribe my name this 26th day of September, 1923.

ERNEST W. DAVIS.